No. 627,234. Patented June 20, 1899.
F. JOHNSON.
FODDER BALER.
(Application filed Jan. 27, 1899.)
(No Model.)
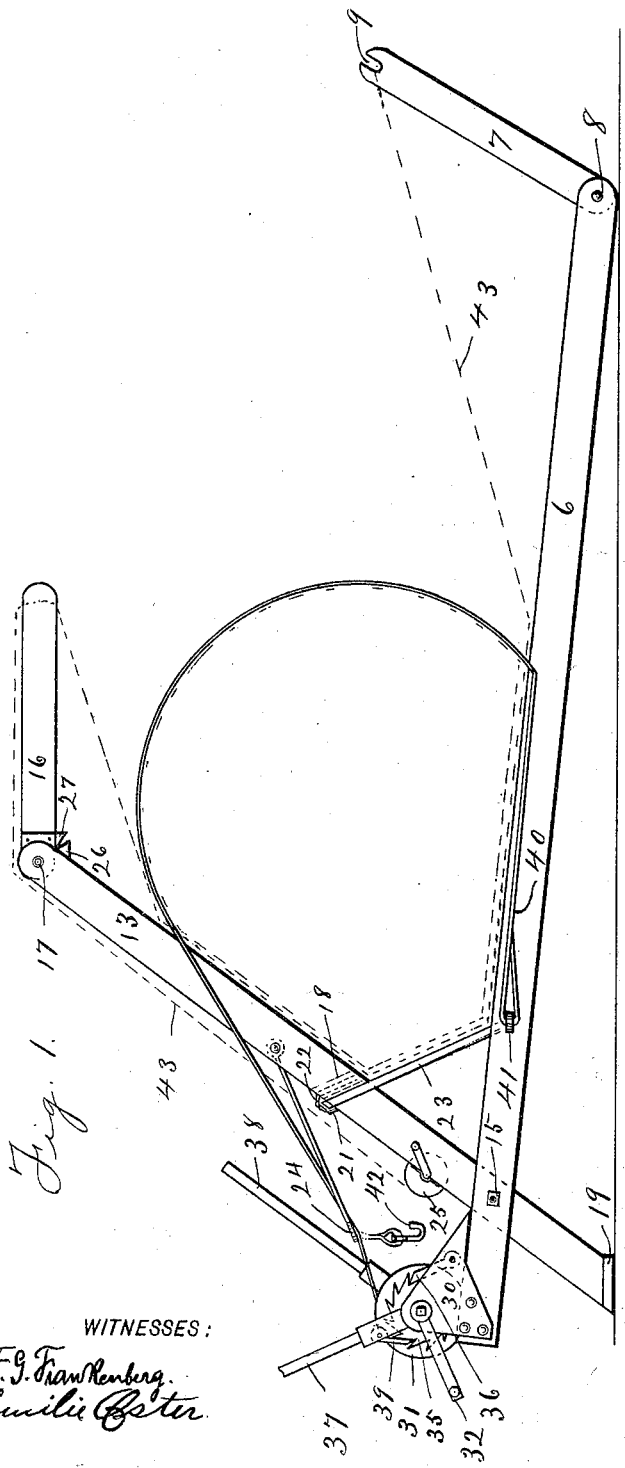
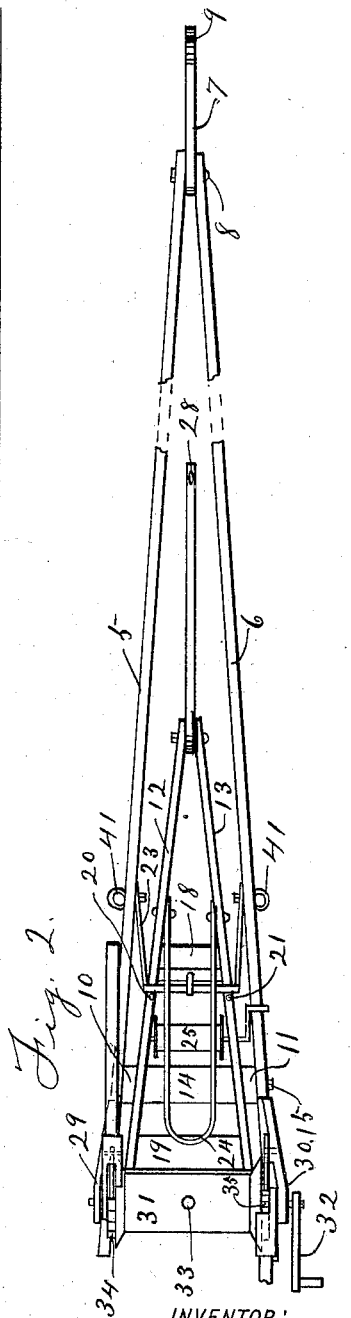
WITNESSES:
F.G. Frankenberg.
Emilie Oster.
INVENTOR:
Frank Johnson,
BY
Semer G. Wells,
ATTORNEY.
THE NORRIS PETERS CO., PHOTO-LITHO., WASHINGTON, D. C.

UNITED STATES PATENT OFFICE.

FRANK JOHNSON, OF FREDERICKSBURG, MISSOURI.

FODDER-BALER.

SPECIFICATION forming part of Letters Patent No. 627,234, dated June 20, 1899.

Application filed January 27, 1899. Serial No. 703,602. (No model.)

*To all whom it may concern:*

Be it known that I, FRANK JOHNSON, a citizen of the United States, residing in the city of Fredericksburg, State of Missouri, have invented an Improvement in Fodder-Balers, of which the following is a specification.

Figure 1 is a side elevation of my fodder-baler, and Fig. 2 is a top plan view.

My object is to construct a light portable baler which can easily be carried or moved from place to place as required to bale cornstalks and fodder upon the field.

My invention consists of a suitable rack upon which the fodder is to be laid and having an upright portion against which the fodder is compressed, a windlass, levers, pawls, and ratchets for operating the windlass, ropes attached to the rack extending upwardly around the fodder upon the rack and attached to the windlass as required to compress the fodder against the upright portion of the rack by the operation of the windlass, a wire reel, and a wire-cutter; and my invention consists, further, of the features herein shown, described, and claimed.

Referring to the drawings in detail, the rack upon which the fodder rests consists of the side pieces 5 and 6. The arm 7 is placed between the forward ends of the pieces 5 and 6, and a bolt 8 secures the three together. A notch 9 is formed in the free end of the arm 7. Spacing-blocks 10 and 11 are placed inside of the side pieces near their rear ends. The upright side pieces 12 and 13 are placed inside of the spacing-blocks 10 and 11. The spacing-block 14 is placed between the uprights, and the bolt 15 passes through the side piece 5 and through 10, 11, 12, 13, and 14, and then through the side piece 6, thus forming a pivotal or hinged connection between the two parts of the rack. The arm 16 is placed between the upper ends of the uprights, and a bolt 17 passes through the three. The cross-piece 18 is inserted between the uprights one-third of the distance up from 15, and the cross-piece 19 connects the lower ends of the uprights. The pins 20 and 21 are driven into the rear edges of the uprights in transverse alinement slightly below the cross-piece 18, and the button 22 is attached to the cross-piece. The link 23 connects the lower side pieces and passes back of the uprights, as required, to limit the upward and backward swing of the uprights and at the same time allows the uprights to swing downwardly into position between the lower side pieces, thus making a folding rack.

When the rack is in position for use, the link 23 is between the pins 20 21 and the button 22. The link 24 connects the uprights and extends backward. The wire-reel 25 is mounted between the uprights. The wire-cutter consists of the blade 26, attached to one of the uprights, and the blade 27, attached to the arm 16. An eye 28 is formed through the free end of the arm 16.

The bearing-blocks 29 and 30 are mounted upon the rear ends of the lower side pieces, and the windlass 31 is mounted between the bearing-blocks. The crank 32 operates the windlass when the work is not too heavy. The drum of the windlass is hollow, and an opening 33 is formed half-way between its ends. The ratchet-wheels 34 and 35 are fixed upon the ends of the drum. Pawls 36 are pivoted to the bearing-blocks in position to engage the ratchet-wheels and prevent the windlass from running backward. The operating-levers 37 and 38 are journaled upon the shaft of the windlass and have pawls 39 to engage the ratchet-wheels. The swinging of the levers back and forth rotates the windlass. The levers are used alternately when the work is light and simultaneously when the work is heavy. The rope 40 is attached to the eyes 41, which extend outwardly from the lower side pieces, and a hook 42 is attached to the center of the rope to engage in the opening at the center of the windlass. The rope is passed forwardly and rests in the notch 9 while the fodder is being piled upon the rack. Then the hook is passed over the fodder, over the uprights, and through the link 24 to engage the windlass. The wire 43 (indicated in dotted lines) runs from the reel upwardly back of the uprights, then downwardly through the eye 28 in front of the uprights, and then forwardly on top of the lower rack. A loop is formed in the end of the wire and hooked into the notch 9. After the bale has been compressed the loop is passed upwardly and backwardly, the wire is cut, and the tie made in the usual way.

I claim—

1. A fodder-baler consisting of the side pieces 5 and 6, the arm 7 placed between the forward ends of said side pieces and secured in position; the spacing-blocks 10 and 11 placed inside of the side pieces near their rear ends; the upright side pieces 12 and 13 placed inside of the spacing-blocks 10 and 11; the spacing-block 14 placed between the uprights 12 and 13; the bolt 15 forming a pivotal connection between the horizontal side pieces and the upright side pieces; a windlass mounted upon the rear ends of the horizontal side pieces; means of operating said windlass, means of holding the uprights in their upright position and a rope or ropes attached to the horizontal side pieces and to the windlass as required to pass around the fodder resting upon the horizontal pieces and against the front faces of the uprights and compressing said fodder by the operation of said windlass, substantially as specified.

2. In a fodder-baler, the horizontal side pieces 5 and 6 connected at their forward ends, the upright side pieces 12 and 13 hinged to the horizontal side pieces near their rear ends; means of holding the upright side pieces in their upright position; a windlass mounted upon the rear ends of the horizontal side pieces, levers and pawl-and-ratchet mechanisms for operating said windlass and ropes attached to the horizontal side pieces and passing forwardly and then upwardly and backwardly and attached to the windlass as required to compress fodder, which rests upon the horizontal side pieces in front of the upright side pieces by the operation of the windlass, substantially as specified.

3. In a fodder-baler, the horizontal side pieces 5 and 6, the arm 7 placed between the forward ends of said horizontal side pieces, said arm having the notch 9 in its forward end; the bolt 8 passing through said side pieces and said arm and forming a hinge; the spacing-blocks 10 and 11 placed inside of the horizontal side pieces near their rear ends; the upright side pieces 12 and 13 placed inside of the spacing-blocks 10 and 11; the spacing-block 14 placed between the uprights; the bolt 15 forming a pivotal connection between the horizontal side pieces and the upright side pieces, the arm 16 placed between the upper ends of the uprights; the bolt 17 passing through the uprights and through the arm 16 and forming a hinged connection; the cross-piece 18; the cross-piece 19 connecting the lower ends of the uprights; the pins 20 and 21 driven into the rear ends of the uprights in transverse alinement slightly below the cross-piece 18; the button 22 attached to the cross-piece 18; the link 23 having its ends attached to the horizontal side pieces and passing back of the uprights and connecting the pins 20 and 21 and the button 22 when it is desired to hold the uprights in their upright position, substantially as specified.

4. In a fodder-baler, the horizontal side pieces 5 and 6 attached together at their forward ends, the upright side pieces 12 and 13 attached together at their upper ends and pivotally connected to the horizontal side pieces; the point of connection being some distance above the lower ends of the uprights and practically an equal distance in front of the rear ends of the horizontal side pieces; the link 23 connecting the horizontal side pieces and passing back of the uprights; means of connecting the link to the uprights as required to hold the uprights in their upright position; a windlass mounted upon the rear ends of the horizontal side pieces, ropes attached to the horizontal side pieces and to the windlass and levers and pawl-and-ratchet mechanisms for operating the windlass, substantially as specified.

5. In a fodder-baler, the uprights 12 and 13, means for supporting the same, the arm 16 placed between the upper ends of the uprights; the bolt 17 passing through said uprights and through said arm; the blade 26 attached to one of the uprights and the blade 27 attached to the arm 16, substantially as specified.

6. In a fodder-baler, horizontal side pieces connected together at their forward ends, upright side pieces connected together at their upper ends and hinged to the horizontal side pieces, the hinge being some distance above the lower ends of the uprights and some distance in front of the rear ends of the horizontal side pieces; the link 23 connecting the horizontal pieces and passing backwardly of the uprights; means of securing the upper end of said link to the uprights as required to hold the uprights in their upright position; a windlass mounted upon the rear ends of the horizontal side pieces, a rope having its ends attached to the horizontal side pieces and passing forwardly and upwardly and then backwardly; a hook connecting the center of said rope to said windlass and the link 24 connecting the uprights and serving as a guide for the rope, substantially as specified.

FRANK JOHNSON.

Witnesses:
FERD. A. F. BOHL,
LEO BOHL.